United States Patent

[11] 3,582,189

| [72] | Inventors | Scott No. Moritz<br>Villa Park;<br>Eugene J. Polley, Lambard, both of, Ill. |
|---|---|---|
| [21] | Appl. No | 753,381 |
| [22] | Filed | Aug. 19, 1968 |
| [45] | Patented | June 1, 1971 |
| [73] | Assignee | Zenith Radio Corporation<br>Chicago, Ill. |

[54] AMBIENT LIGHT FILTER FOR A TELEVISION RECEIVER
4 Claims, 5 Drawing Figs.

[52] U.S. Cl................................................. 350/276, 178/7.85
[51] Int. Cl...................................................G02b 27/00, H01j 29/89
[50] Field of Search........................................... 350/276, 263; 178/7.82, 7.85

[56] References Cited

UNITED STATES PATENTS

| 2,875,670 | 3/1959 | Thornton | 350/276X |
| 2,922,998 | 1/1960 | Stephenson | 178/7.85 |
| 3,037,419 | 6/1962 | Nixon | 350/276 |
| 2,942,254 | 6/1960 | Beers | 350/276X |
| 2,977,412 | 3/1961 | Rhodes et al. | 350/276X |
| 3,402,981 | 9/1968 | Cardone | 350/276 |

FOREIGN PATENTS

| 1,383,756 | 1964 | France | 350/276 |

OTHER REFERENCES

Beers; G. L., " Minimizing the Effects of Ambient Light on Image Reproduction", Journal of the SMPTE Volume 66, June 1957, pp. 347— 354

*Primary Examiner*—David Schonberg
*Assistant Examiner*—Toby H. Kusmer
*Attorneys*—John J. Pederson and Eugene M. Cummings

ABSTRACT: A light-masking device for improving the contrast of a television image under conditions of high ambient light comprises an optical filter having a grid of parallel alternately opaque and transparent strips of sufficient width to discriminate against nonplanar incident light. Mounting tabs selectively support the filter in a first position in front of the viewing screen such that the strips are inclined from the horizontal in one direction to discriminate against light directed from above and to the left and alternately in a second position such that the strips are inclined from the horizontal in the opposite direction to discriminate against light directed from above and to the right. The resulting structure is compact and economical to manufacture.

PATENTED JUN 1 1971   3,582,189

Inventors
Scott N. Moritz
Eugene J. Polley

By *Eugene M. Cummings*
Agent

AMBIENT LIGHT FILTER FOR A TELEVISION RECEIVER

BACKGROUND OF INVENTION

The present invention relates to optical devices for improving the quality of images viewed on the viewing screen of a television receiver, and more particularly to light-masking devices for improving the contrast of the reproduced image under conditions of high ambient light in the viewing area.

The image produced by a television receiver operating in an environment containing strong ambient light generally suffers severe contrast degradation by reason of reflection of the ambient light from the viewing screen of the receiver. This problem exists because the ambient light, whether natural or artificial, strikes the glass surfaces of the receiver picture tube and safety glass and is reflected to the eyes of the viewer together with the light from the television image itself. In an indoor environment these reflections are often so annoying that it becomes necessary to extinguish much of the normal room lighting which, besides restricting other activities in the room, often results in the television image having an annoying glaring effect on the viewer. Of course, when viewing the receiver in an outdoor environment this remedy is not available and the viewer must either employ an accessory light-masking device or content himself with an image of extremely poor contrast.

Light-masking devices heretofore employed for alleviating the effects of ambient light have usually taken the form of sunshades or hoods which attempt to reduce degradation by creating a light shield above and around the sides of the picture tube. These devices, besides being cumbersome and difficult to carry, greatly detract from the appearance of the receiver cabinet. Another less cumbersome light-masking method heretofore employed has featured the use of an optical filter in front of the picture tube viewing screen. Unfortunately, such filters have not seen wide use because they have either been ineffective or have objectionably reduced the angle from which the television receiver could be viewed. Furthermore, none of these filters could be adjusted to compensate for varying conditions of ambient light incidence and viewer location.

Thus, until the present invention an unfulfilled demand has existed for an optical filter type light mask which does not objectionably restrict the receiver viewing angle and is capable of being adjusted to compensate for various combinations of incident light direction and viewer location.

SUMMARY OF THE INVENTION

Accordingly, it is a general object of the present invention to provide a new and improved light-masking device for reducing the effects of ambient light upon the contrast of the image reproduced on the screen of a television receiver.

It is a more specific object of the invention to provide an economical noncumbersome light-masking device for reducing the detrimental effects of ambient light on the reproduced image of a television receiver.

It is a more specific object of the invention to provide an economical noncumbersome light-masking device for reducing the detrimental effects of ambient light on the reproduced image of a television receiver.

It is a still more specific object of the invention to provide a light-masking device which is adjustable for varying conditions of ambient light incidence and viewer location to reduce the effects of ambient light on the image reproduced on the viewing screen of a television receiver.

The invention is directed to a light-masking device for the viewing screen of a television receiver for reducing the degrading effect of ambient light on the image reproduced thereon. The masking device comprises a semitransparent optical filter comprising a grid of alternately opaque and transparent strips disposed edgewise to the viewing screen and of sufficient width to discriminate against ambient light nonplanar to the strips while allowing coplanar light from the viewing screen to pass. Mounting means are provided for selectively supporting the filter in a first position in front of the picture tube in which the strips are inclined from the horizontal in one direction to discriminate against light incident from above and to the left of the screen, or alternately in a second position in which the strips are inclined from the horizontal in the opposite direction to discriminate against light incident from above and to the right of the screen.

BRIEF DESCRIPTION OF THE DRAWINGS

The foregoing and other objects of the invention which are believed to be novel are set forth with particularity in the appended claims. The organization and manner of operation of the invention, together with further objects and advantages thereof, may best be understood by reference to the following description taken in conjunction with the accompanying drawings, the several figures of which like reference numerals identify like elements, and in which:

DESCRIPTION OF THE PREFERRED EMBODIMENT

Figure 1:
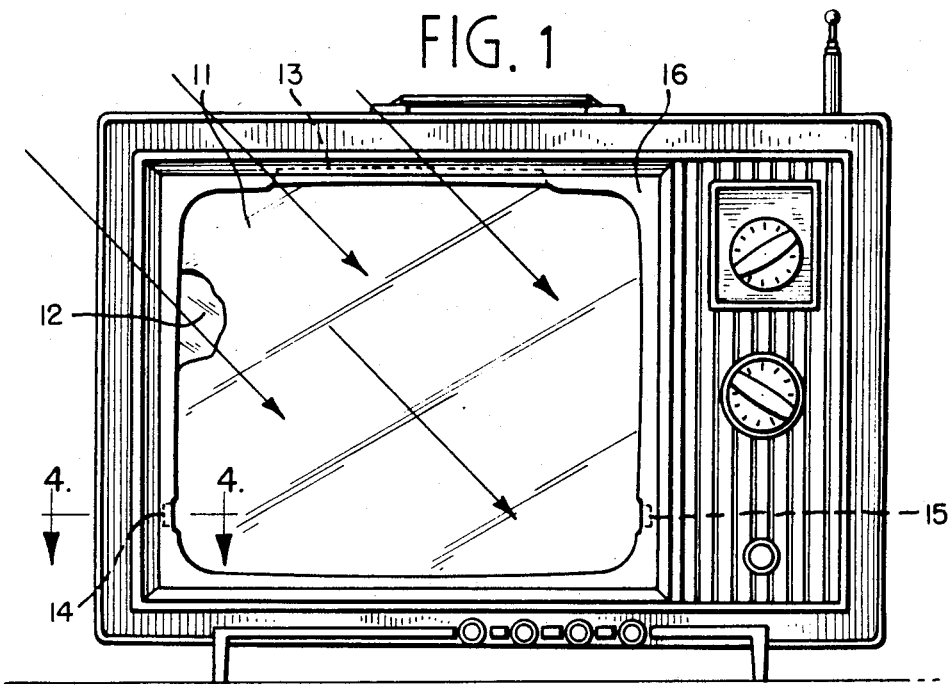
FIG. 1 is an elevational view showing a television receiver cabinet incorporating a light-masking device constructed in accordance with the invention.
Figure 4:
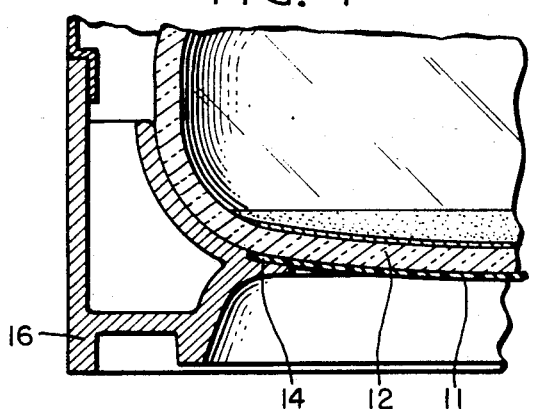
FIG. 4 is a cross-sectional view taken along lines 4—4 of FIG. 1.

Referring to FIGS. 1 and 4, the light-masking device of the invention comprises a semitransparent optical filter 11 positioned in front of the viewing screen 12 of the illustrated television receiver by a trio of support tabs 13, 14 and 15 which are received in corresponding slots provided in the receiver escutcheon 16. For reasons which will be covered shortly, this mounting arrangement is horizontally symmetrical so that the filter can be reversed, and vertically asymmetrical to prevent the filter from being inverted.

Figure 5:
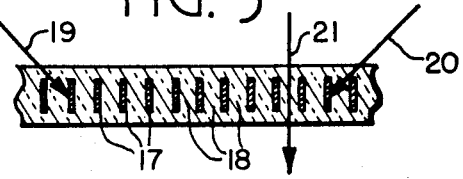
FIG. 5 is a cross-sectional view of an optical filter type light-masking device constructed in accordance with the invention.

The optical filter 11 is seen in FIG. 5 to comprise a plurality of equispaced opaque strips collectively identified 17 separated by intervening strips of transparent flexible plastic, collectively identified 18. By virtue of the parallel opaque strips, the filter has the property of discriminating against incident light nonplanar with transparent strips 18, while allowing coplanar light to pass virtually unattenuated. For example, the incident light represented by arrows 19 and 20 in FIG. 5 would not pass, while the coplanar light represented by arrow 21 would pass. In practice, the filter, which is only 0.20 thick, is manufactured by first applying carbon ink in a gridlike pattern on successive layers of a transparent plastic such as acetate buterate, and then compressing these layers between additional layers of transparent plastic. The opaque strips of ink are approximately 0.002 inch thick and 0.015 inch wide and are separated from each other by approximately 0.009 inch.

Figure 2:
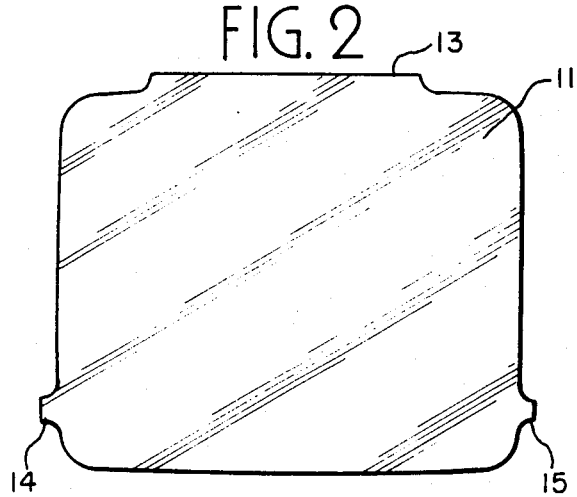
FIG. 2 is a front view of an optical filter type light-masking device constructed in accordance with the invention and situated in a first position.
Figure 3:
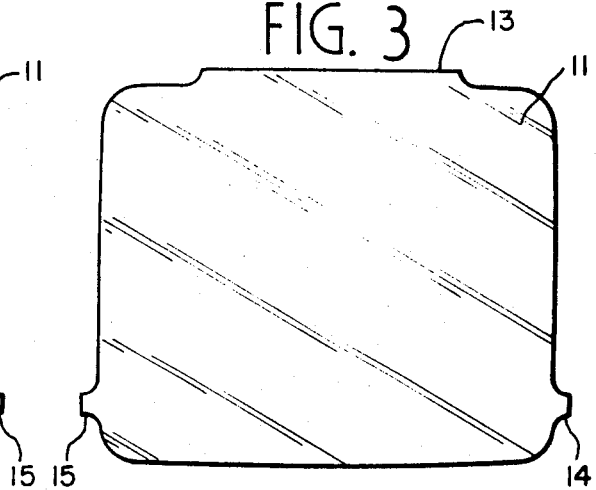
FIG. 3 is a front view of the optical filter of FIG. 2 in a second position corresponding to the reverse of the first position.

In accordance with the invention, the optical filter material described above is utilized as an effective and adjustable light-masking device by orienting the strips at angles of approximately 30° to the horizontal. When the strips are inclined upward to the right as shown in FIG. 2, the filter discriminates against light directed from above and to the left, while allowing the essentially coplanar light from the reproduced image to pass through to viewers in the center and to the right without attenuation. Conversely, when the strips are inclined upward to the left as in FIG. 3, the filter discriminates against incident light coming from above and to the right, while allowing light from the image to pass outward to viewers in the center and to the left.

Thus, all the viewer need do to reduce the effects of incident light is to determine the direction of incidence and orient the strips accordingly. By virtue of the horizontally symmetrical tab mounting arrangement the orientation of the strips can be changed by the viewer at will by merely reversing the filter relative to the viewing screen. As mentioned earlier, the mounting tabs are vertically asymmetrical to prevent the filter from being inverted as this would not reverse the orientation of the strips and could only confuse the viewer. When the filter is not needed it can be removed from the receiver without exposing unsightly mounting holes in the receiver escutcheon.

Of particular advantage to the invention is its compactness and the ease by which it can be installed and removed from a television receiver. The optical material employed in the filter is economical and readily obtainable and mounting provisions are easily incorporated in existing escutcheon design. Furthermore, because of its simplicity and economy of manufacture the invention lends itself to incorporation in large-volume consumer-television receivers where economy of manufacture is necessarily of prime importance.

While a particular embodiment of the present invention has been shown and described, it will be obvious to those skilled in the art that changes and modifications may be made without departing from the invention in its broad aspects. Accordingly, the aim in the appended claims is to cover all such changes and modifications as may fall within the true spirit and scope of the invention.

We claim:

1. A stationary light-masking device for the viewing screen of a television receiver for reducing the degrading effect of ambient light on the image produced thereon comprising:

an optical filter comprising a detachably mountable sheet of transparent material in which a plurality of thin opaque strips are embedded edgewise to the plane of said viewing screen in substantially equispaced, oblique, and nonintersecting parallel rows, said strips having sufficient widths to discriminate against ambient light nonplanar to said strips while allowing light coplanar thereto to freely pass through said viewing screen; and mounting means for selectively supporting said filter in a first position in front of said screen in which said strips are inclined from the horizontal in one direction to selectively discriminate against light incident from above and to the left of said screen; and in a second position in which said strips are inclined from the horizontal in the opposite direction to selectively discriminate against light incident from above and to the right of said screen wherein one side of said filter faces said viewing screen in said first position and the other side faces said screen in said second position.

2. A light-masking device as described in claim 1 wherein the inclination of said strips relative to the horizontal in said first and second positions is approximately 30°.

3. A light-masking device as described in claim 1 wherein said mounting means comprises a plurality of tabs arranged horizontally symmetrical and vertically asymmetrical to enable said filter to be reversed but not inverted.

4. A light-masking device as described in claim 1 wherein said sheet of transparent material is of a given thickness while said opaque strips embedded edgewise therein exhibit thicknesses on the order of one-tenth said sheet thickness and widths greater than one-half said sheet thickness, said opaque strips being aligned in said parallel rows at a spacing therebetween on the order of one-half that of the thickness of said transparent sheet.